United States Patent [19]
Spanke et al.

[11] 3,835,971
[45] Sept. 17, 1974

[54] FLUID OPERATED CLUTCH AND BRAKE

[75] Inventors: Edwin A. Spanke, Oak Forest; Louis F. Carrieri, La Grange Park; Melvin H. Francey, Palos Heights, all of Ill.

[73] Assignee: Gulf & Western Manufacturing Company, New York, N.Y.

[22] Filed: Aug. 29, 1973

[21] Appl. No.: 392,681

[52] U.S. Cl. .......... 192/18 A, 192/113 B, 188/71.2, 91/151, 92/117
[51] Int. Cl. ............................................ F16d 67/04
[58] Field of Search ...................... 192/18 A, 12 C

[56] References Cited
UNITED STATES PATENTS

| | | |
|---|---|---|
| 3,077,252 | 2/1963 | Treer .............................. 192/18 A |
| 3,182,776 | 5/1965 | Sommer .......................... 192/18 A |
| 3,494,450 | 2/1970 | Mankowsky et al ............. 192/18 A |
| 3,605,963 | 9/1971 | Roob et al ....................... 192/18 A |

Primary Examiner—Benjamin W. Wyche
Attorney, Agent, or Firm—Meyer Tilberry & Body

[57] ABSTRACT

A press drive mechanism is disclosed having brake and clutch disc assemblies concentric with respect to the output shaft of the mechanism, and a concentric fluid operated piston-cylinder assembly for alternately actuating the brake and clutch mechanisms. Air actuated and hydraulic fluid actuated piston and cylinder arrangements are disclosed, and an arrangement is disclosed for incremental rotation of the output shaft when the brake mechanism is actuated.

10 Claims, 9 Drawing Figures

FLUID OPERATED CLUTCH AND BRAKE

This invention relates to the art of transmissions and, more particularly, to a brake and clutch mechanism for use with heavy machinery such as metal working presses.

Liquid cooled and lubricated clutch and brake drive units have been provided heretofore for use with heavy machinery such as presses. Such units generally include a drive shaft, a flywheel driven by a motor, a clutch mechanism for selectively connecting and disconnecting the flywheel and output shaft, and a brake mechanism for braking rotation of the output shaft when the clutch is actuated to disengage the flywheel and output shaft. A suitable liquid, such as oil, is circulated through the housing of the drive unit to lubricate and cool the operating parts thereof including the brake and clutch components during operation of the drive unit.

Clutch and brake units of the foregoing character are desirable in that they can be manufactured as a unit readily mountable with respect to machinery to be driven therethrough such as a press. The unit design permits high-production techniques to be used in manufacturing with resulting cost benefits, and the unit is easily mounted and removed with respect to a machine with which it is to be used.

In brake, clutch and flywheel units heretofore provided, certain structural features have been employed which are detrimental to optimum operation and life of the unit and component parts thereof. For example, the brake and clutch assemblies of the unit have been provided with corresponding actuating devices operable in a manner which allows overlapping actuation during release of the clutch and engagement of the brake, and vice versa. Further, the clutch and brake actuating mechanisms are located within the unit in a manner whereby access thereto for maintenance and/or replacement is a major, time consuming operation. Moreover, the actuating mechanisms are structurally complex and accordingly expensive both with respect to manufacturing, replacement and maintenance costs.

A further disadvantage encountered in conjunction with prior transmission units of the foregoing character is the inability to incrementally advance the output shaft following a braking operation. In this respect, if the mechanism driven by the output shaft is not in a desired position following a braking operation, it is necessary with the prior devices to attempt to momentarily disengage the brake and engage the clutch to advance the output shaft. Such efforts more often than not result in under or over displacement of the output shaft and accordingly the device driven thereby, whereby a further attempt or attempts are required to achieve the desired position of the device driven through the transmission unit. It will be appreciated that in the operation of a press or the like by such a transmission unit, considerable production time is lost as a result of such efforts to move the device driven by the transmission unit to a desired position.

In accordance with the present invention, an improved clutch-brake-flywheel drive unit is provided which overcomes the disadvantages heretofore encountered in such units, including the disadvantages specifically enumerated above. In this respect, a clutch-brake-flywheel drive unit is provided comprised of clutch discs and brake discs axially spaced apart and concentric with respect to an output shaft with which the flywheel is also concentrically disposed. The actuating mechanism for the brake and clutch assemblies is fluid actuated and is comprised of piston and cylinder components disposed adjacent one end of the drive shaft so as to be readily accessible for replacement and/or maintenance operations. Further, the brake and clutch disc elements are actuated by the piston and cylinder components through a mechanical arrangement which assures against clutch and brake overlap during release of one and engagement of the other of the clutch and brake assemblies. This advantageously decreases wear of the brake and clutch disc elements and eliminates the imposition of unnecessary and undesirable loads on the drive units during transfer from clutched to braked mode or vice versa.

In accordance with one aspect of the present invention, the piston and cylinder arrangement for actuating the brake and clutch assemblies is comprised of cylinder and piston elements surrounding the drive shaft. The cylinder is axially displaceable in opposite directions relative to the piston to alternately actuate the brake and clutch assemblies. The annular piston and cylinder arrangement advantageously provides for uniform application of actuating force with respect to the brake and clutch disc components. In accordance with one embodiment of the invention the piston and cylinder elements are air actuated, while in accordance with another embodiment they are hydraulically actuated.

In accordance with another aspect of the invention, the discs of the brake and clutch assemblies are disposed on axially opposite sides of a fixed abutment mounted on the drive shaft and are alternately displaced toward the corresponding face of the abutment to achieve engagement of one and release of the other. Displacement of the disc elements is achieved by a corresponding presser member, and the two presser members are mechanically interlocked in axially spaced apart relationship so as to prevent an overlap in the operation of the clutch and brake assemblies. The arrangements of the clutch and brake assemblies and the piston and cylinder actuator assembly advantageously enables either or both ends of the output shaft to deliver the output of the drive unit.

In accordance with a further aspect of the present invention, the brake assembly is selectively rotatable, as a unit relative to the housing. This enables release of the drive shaft for incremental rotation after the clutch is disengaged and the drive shaft is stopped by the brake assembly. This advantageously provides for the drive shaft and the device driven by the drive shaft to be displaced to a desired position with ease and extreme accuracy regardless of the position thereof upon braking of the drive shaft following release of the clutch assembly.

Accordingly, it is an outstanding object of the present invention to provide a clutch and brake type drive unit having an improved clutch and brake actuating mechanism.

Another object is the provision of a drive unit of the foregoing character in which overlap of operation between the clutch and brake assemblies is minimized or eliminated.

Yet another object is the provision of a drive unit of the foregoing character in which the brake and clutch assemblies are actuated by an improved fluid operated piston and cylinder arrangement and in which the piston and cylinder elements are easily accessible for repair and/or replacement operations.

Still another object is the provision of a drive unit of the foregoing character which provides for uniform application of operating pressure to the brake and clutch assemblies.

Still a further object is the provision of a brake-clutch-flywheel drive unit in which the drive shaft of the unit is adapted to be advanced accurately following braking thereof by the brake assembly to enable selective positioning of the drive shaft relative to the braked position thereof.

Still another object is the provision of a brake-clutch-flywheel drive unit in which either or both of the opposite ends of the drive shaft are operable as output ends.

The foregoing objects, and others, will in part be obvious and in part more fully pointed out hereinafter in conjunction with the description of preferred embodiments of the invention illustrated in the accompanying drawings in which.

Figure 1:
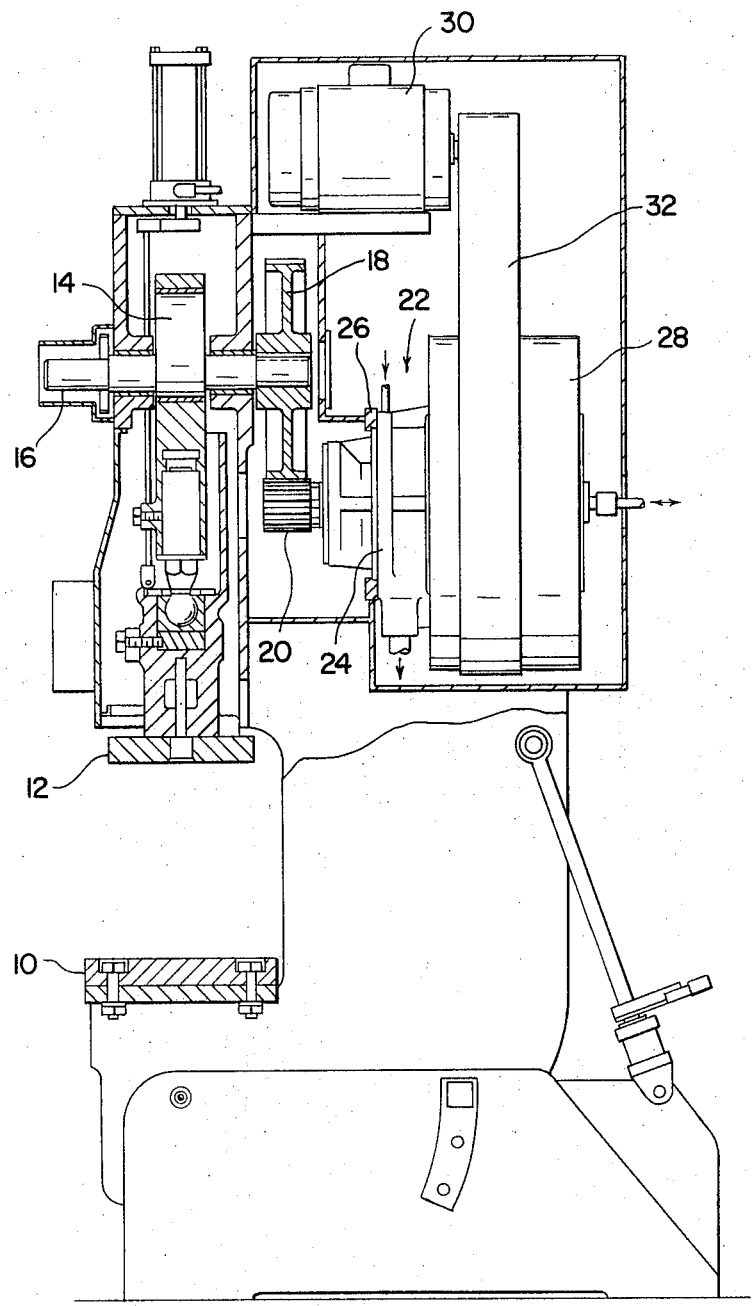
FIG. 1 is a side elevational view, partially in section, of a press and illustrating a drive unit of the present invention mounted thereon.

Referring now in greater detail to the drawings wherein the showings are for the purpose of illustrating preferred embodiments of the present invention only and not for the purpose of limiting the invention, a metal-working press is illustrated in FIG. 1 of the drawing which includes a frame supporting a fixed work supporting platen 10 and a reciprocable tool supporting platen 12. The tool supporting platen is adapted to be reciprocated in a well known manner by means of a rotatable crank 14 having a shaft 16 which is supported for rotation by the press frame and is provided on one of its opposite ends with a drive gear 18, whereby rotation of gear 18 rotates crankshaft 14 to impart reciprocating motion to tool support platen 12.

Gear 18 is adapted to be rotated by a pinion gear 20 which is coupled to the output shaft of a clutch-brake drive mechanism 22 of the present invention. As described more fully hereinafter, drive mechanism 22 includes a housing 24 having a peripheral mounting flange by which the drive mechanism is removably interconnected with a mounting flange 26 of the press frame. Further, drive mechanism 22 includes a flywheel 28 rotatably supported by housing 24 and adapted to be driven by a suitable motor such as electrical motor 30 through a drive belt 32.

Figure 2:
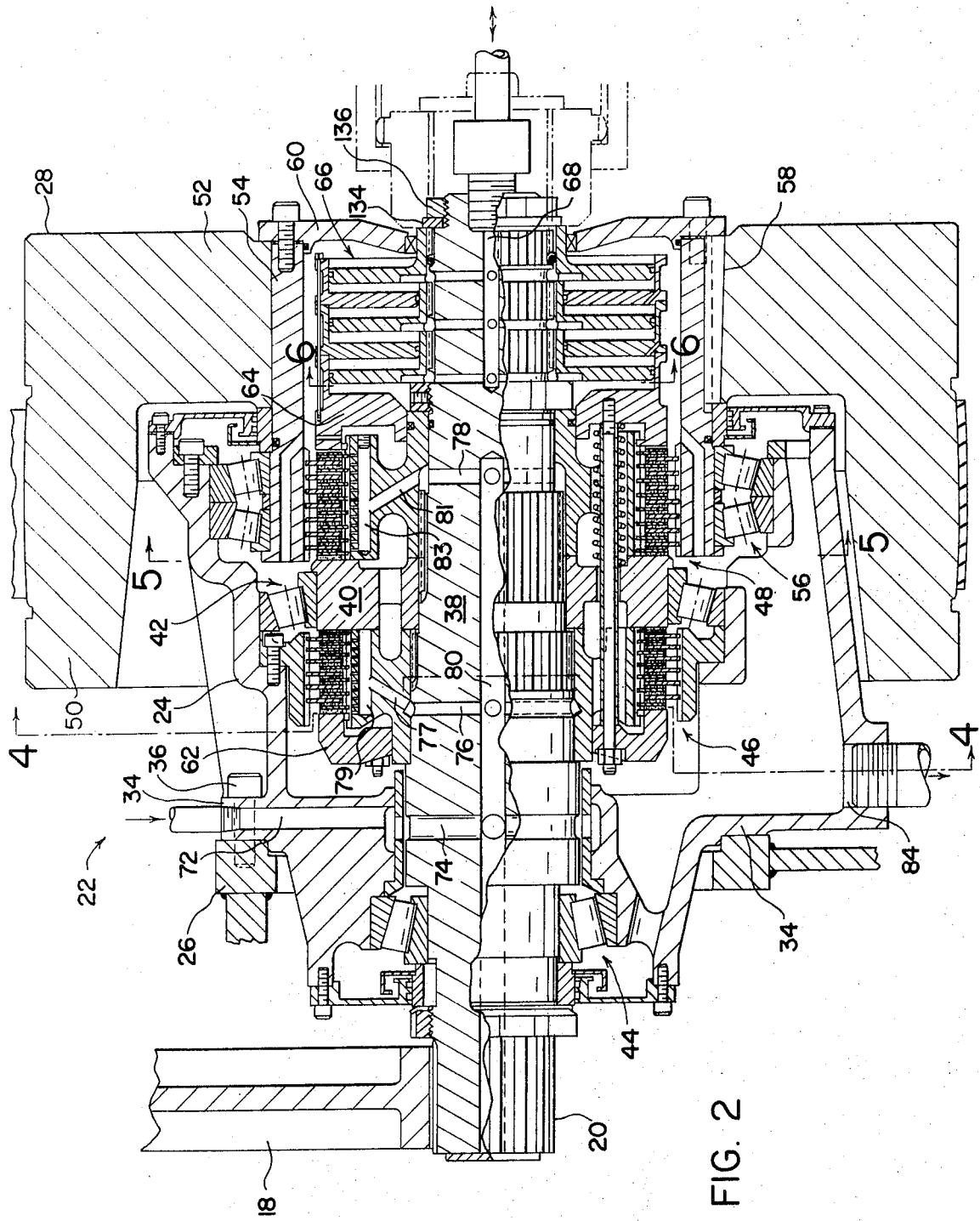
FIG. 2 is an elevational view, in section, of the drive unit illustrated in FIG. 1.

The general arrangement of the components of drive mechanism 22 is best illustrated in FIG. 2 of the drawing. Housing 24 is generally cylindrical in cross section, and it will be seen from FIG. 2 that the housing is provided intermediate its opposite ends with radially extending wall or flange portions 34 for releasably interconnecting the drive unit with the press frame such as by the use of bolts 36 extending through wall 34 and into threaded engagement with corresponding openings in press flange 26.

Drive mechanism 22 further includes an output shaft 38 supported within housing 24 for rotation relative thereto. More particularly, shaft 38 is provided intermediate its opposite ends with an abutment plate 40 which is splined or otherwise interconnected with shaft 38 for rotation therewith and which serves a purpose set forth more fully hereinafter. A roller bearing assembly 42 is interposed between housing 24 and abutment plate 40, and a roller bearing assembly 44 is interposed between housing 24 and shaft 38 adjacent one end of housing 24. Bearing assemblies 42 and 44 support shaft 38 for rotation relative to housing 24 and against axial displacement relative thereto during rotation.

The drive mechanism further includes a brake assembly 46 on one side of abutment plate 40 and a clutch assembly 48 on the opposite side of abutment plate 40 and which brake and clutch assemblies are described in greater detail hereinafter. Flywheel 28 of the drive mechanism includes a cylindrical outer portion 50 surrounding the corresponding end of housing 24, and a radially extending end portion 52. The flywheel is mounted on a sleeve 54 extending axially inwardly of the corresponding end of housing 24 in surrounding relationship with respect to shaft 38. A roller bearing assembly 56 is interposed between sleeve 54 and housing 24 to support the flywheel for rotation relative to the housing. Sleeve 54 has a radially flanged inner end against which the corresponding end of bearing assembly 56 abuts. End portion 52 of the flywheel is interconnected with sleeve 54 for rotation therewith such as by splines 58, and an end plate 60 is bolted to the outer end of sleeve 54 to retain the flywheel in axially mounted relationship with respect to sleeve 54.

As described more fully hereinafter, rotation of flywheel 28 is adapted to impart rotation to shaft 38 through clutch assembly 48 upon actuation of the clutch assembly, and upon disengagment of the clutch assembly brake assembly 46 is adapted to be actuated to stop rotation of shaft 38. The brake and clutch assemblies are adapted to be actuated by corresponding brake and clutch presser members 62 and 64, respectively, the operation of which is set forth hereinafter. Presser members 62 and 64 are annular rings axially displaceable relative to shaft 38 toward and away from the corresponding side of abutment plate 40. Displacement of the presser members is by means of a brake and clutch operating mechanism including a fluid actuated piston and cylinder assembly 66 surrounding shaft 38 adjacent the end thereof underlying radial end portion 52 of the flywheel. In the embodiment illustrated in FIG. 2, piston and cylinder assembly 66 is air actuated and, for this purpose, the corresponding end of shaft 38 is provided with an axial passageway 68 and a plurality of radial extending passageways 70 leading from passage 68 to the piston and cylinder components. Passage 68, of course, is connected to a suitable source of air under pressure, not illustrated.

Preferably, drive mechanism 22 is lubricated and cooled during operation by a suitable fluid such as oil. For this purpose, housing 24 is provided with an inlet passage 72 connectable to a suitable source of cooling and lubricating fluid. Passage 72 opens within housing 24 radially outwardly of shaft 38, and shaft 38 is provided with radial passages 74, 76 and 78 interconnected by an axial passage 80, whereby the lubricating and cooling fluid is distributed within the housing to the various components of the assembly including the brake and clutch assemblies and the bearing assemblies. The housing is further provided with a sump area 82 and an outlet passage 84 for the cooling and lubricating fluid, whereby the fluid can be circulated through the device and cooled exteriorly thereof if desired.

The structure and operation of the brake and clutch assemblies and the actuating mechanism therefore will be best understood by referring to FIGS. 3–6 of the drawing. In this respect, brake assembly 46 includes a support ring 86 having a splined interconnection 88 with shaft 38. Clutch assembly 48 includes an annular support ring 90 having a splined interconnection 92 with shaft 38, and annular abutment plate 40 is interposed between support rings 86 and 90 and has a splined interconnection 94 with shaft 38. Shaft 38 is provided with a shoulder 96 against which support ring 86 abuts, and a retaining ring 98 is threadedly engaged with shaft 38 to axially position support rings 86 and 90 and abutment plate 40 relative to the shaft.

A plurality of brake discs 100 surround support ring 86 and are interengaged therewith such as by splined interconnection 102. In a well known manner, splined interconnection 102 provides for discs 100 to rotate with ring 86 and to be axially slideable relative thereto. Similarly, a plurality of clutch discs 104 surround clutch ring 90 and are interengaged therewith by a splined interconnection 106, whereby discs 104 are rotatable with ring 90 and are axially slideable relative thereto. Support ring 86 is provided with passageways 77 and 79, and support ring 90 is provided with passageways 81 and 83. Passageways 77 and 81 communicate with shaft passages 76 and 78 to transfer cooling and lubricating fluid to the clutch and brake assemblies.

Brake assembly 46 further includes a support ring 108 which is fixed with repect to housing 24 of the drive mechanism. Ring 108 supports a plurality of brake discs 110 each of which is interposed between a pair of the brake discs 100. Brake discs 110 and ring 108 have a splined interconnection 112 which provides for discs 110 to be fixed against rotation and to be axially slideable relative to ring 108. Clutch assembly 48 further includes a plurality of clutch discs 114 having a splined interconnection 116 with sleeve 54. Each of the discs 114 is interposed between a pair of the discs 104, and spline interconnection 116 provides for discs 114 to rotate with the flywheel and sleeve 54 and to be axially displaceable relative thereto.

Figure 3:
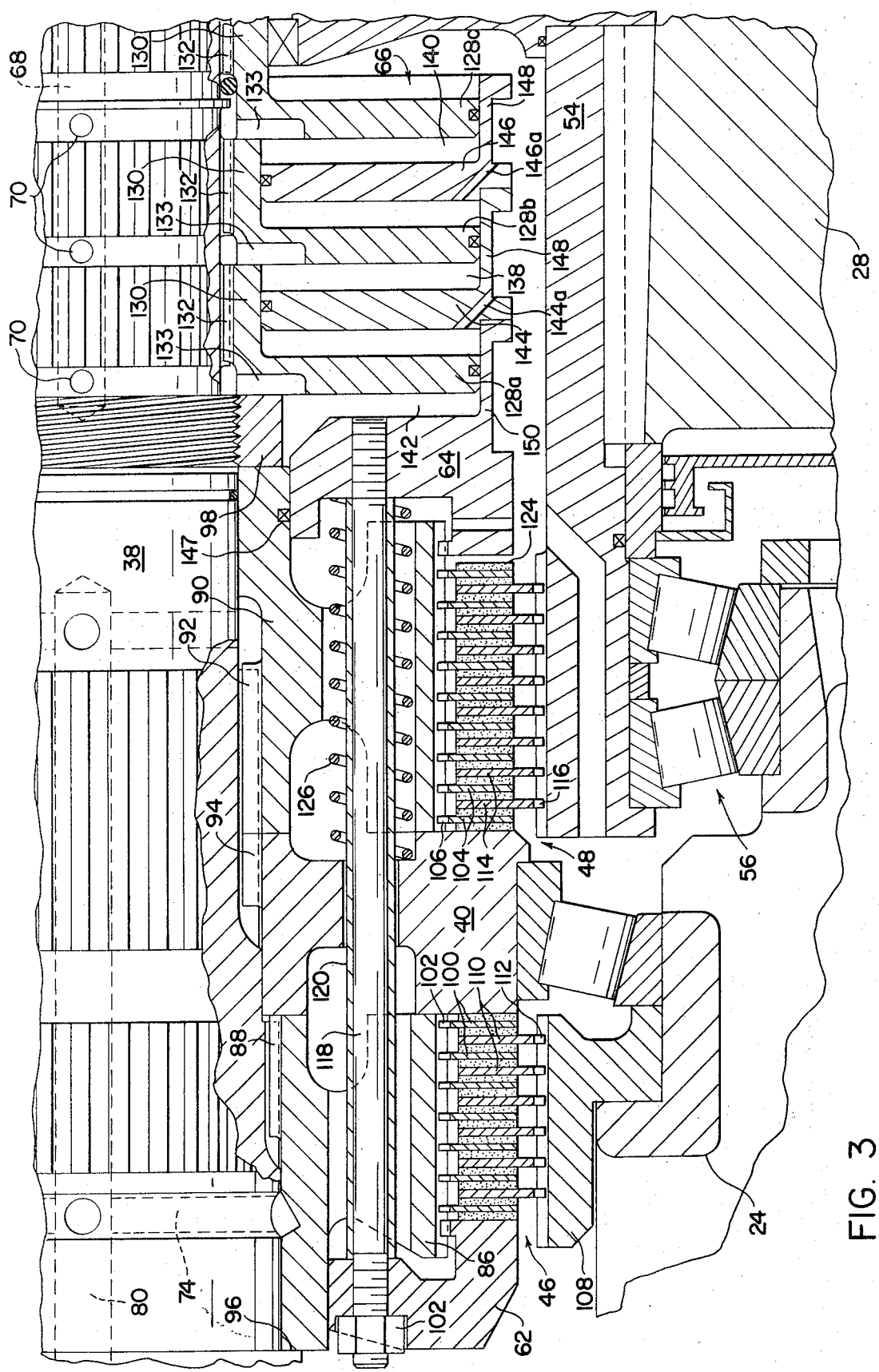
FIG. 3 is a detail view, in section, of a portion of the brake and clutch assemblies of the drive unit illustrated in FIG. 2.
Figure 4:
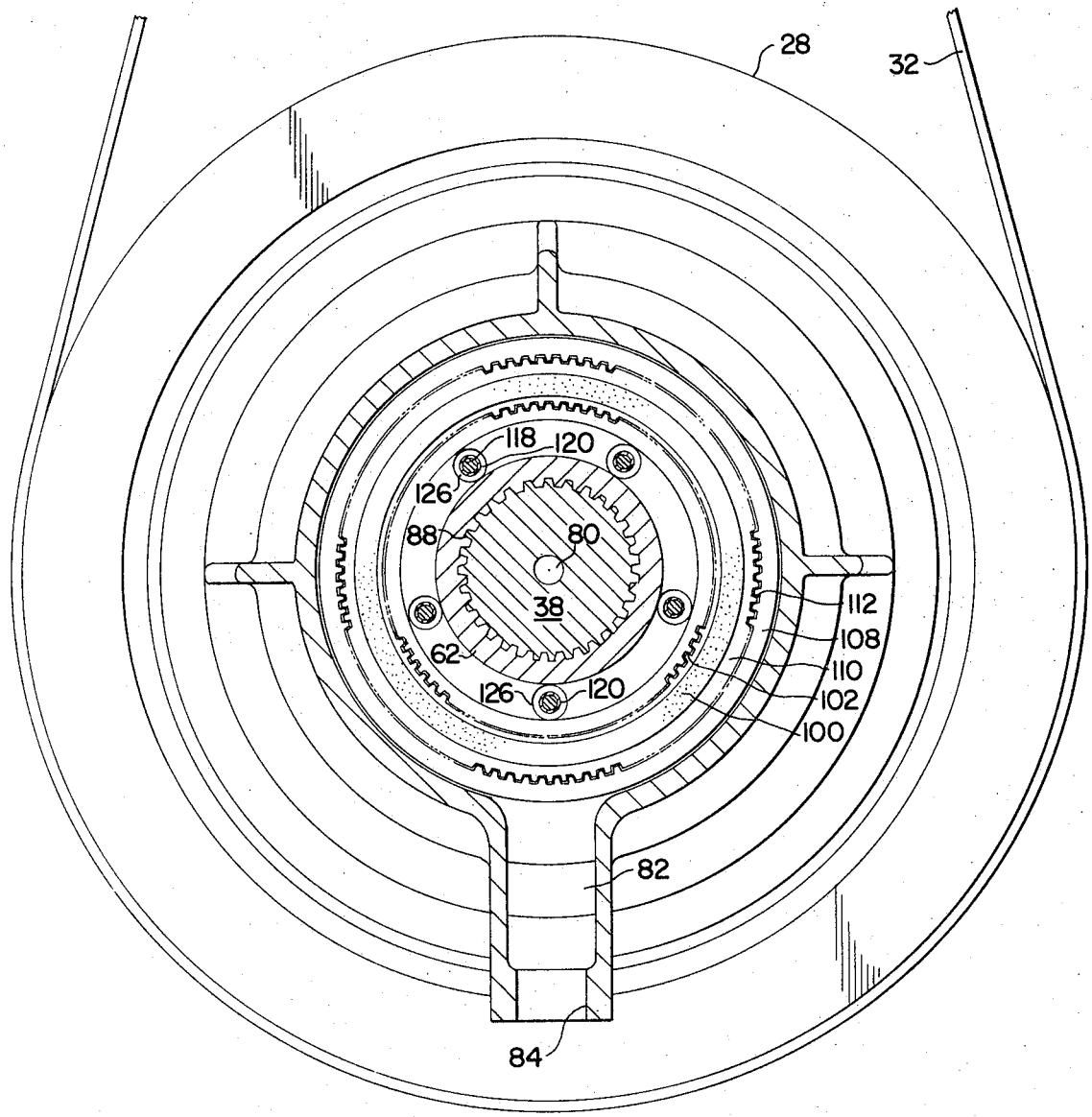
FIG. 4 is a cross-sectional view of the drive unit illustrated in FIG. 2, the section being along line 4—4 in FIG. 2.
Figure 5:
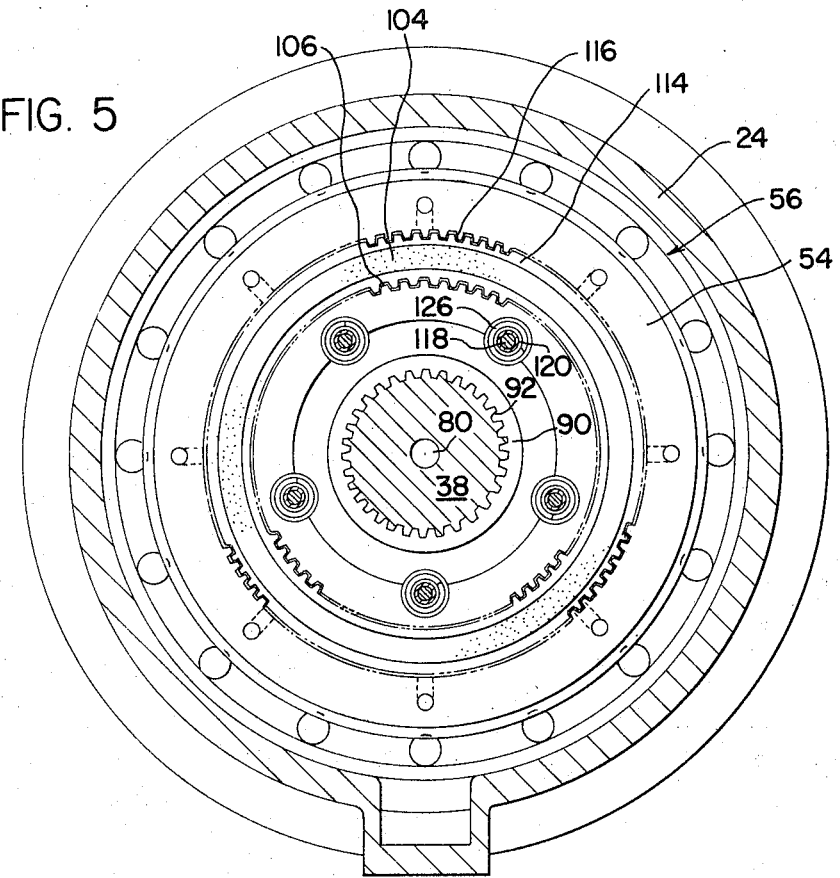
FIG. 5 is a cross-sectional view of the drive unit illustrated in FIG. 2, the section being along line 5—5 in FIG. 2.
Figure 6:
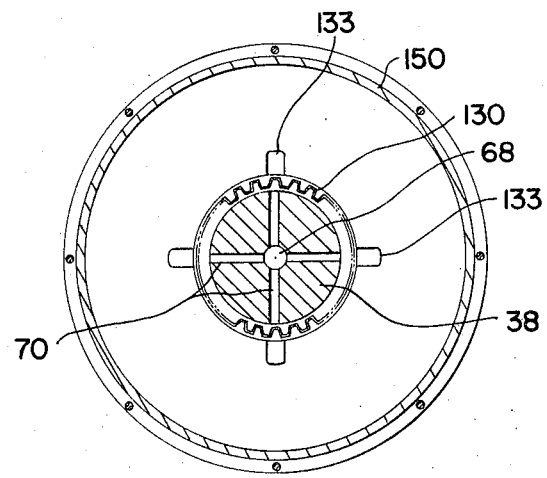
FIG. 6 is a cross-sectional view of the drive unit illustrated in FIG. 2, the section being along line 6-6 in FIG. 2.

It will be appreciated from the foregoing description that rotation of flywheel 28 and engagement of the clutch imparts rotation to shaft 38 relative to housing 24, and that release of the clutch and engagement of the brake stops rotation of the shaft. The clutch and brake assemblies are alternately engaged and disengaged by actuation of presser plates 62 and 64, and the presser plates are mechanically interlocked to prevent an overlap in operation of the clutch and brake assemblies. In this respect, as illustrated in FIG. 3, support rings 86 and 90 and abutment plate 40 are provided with aligned apertures through which rigid actuator rods 118 and sleeves 120 extend. Sleeves 120 engage the inner faces of presser plates 62 and 64 to retain the plates in a desired axially spaced relationship, and rods 118 serve to interconnect the presser plates and sleeves. For this purpose, one end of each rod 118 is threadedly engaged with pressure plate 64 and the other end is threaded to receive a nut 122 by which pressure plates are drawn against the corresponding ends of sleeve 120.

The brake and clutch assemblies are actuated by axially displacing pressure plates 62 and 64 relative to abutment plate 40 to alternately press the brake and clutch discs toward the corresponding face of abutment plate 40. In the positions of the components illustrated in FIG. 3, the brake is actuated and the clutch disengaged, whereby an axial space 124 exists between the inner face of pressure plate 64 and the adjacent one of the clutch discs 104. When the pressure plates are axially displaced to disengage the brake and engage the clutch, a similar space exists between the inner face of pressure plate 62 and the adjacent one of the brake discs 100. This space assures release of the brake prior to engagement of the clutch and vice versa.

Presser plates 62 and 64 are axially slideable relative to the outer surfaces of support rings 86 and 90, respectively. In the embodiment illustrated, the presser plates are actuated axially to cause engagement of the clutch by fluid actuated piston and cylinder assembly 66 described in detail hereinafter, and are axially displaced in the opposite direction to release the clutch and engage the brake by means of a plurality of biasing compression springs 126 each surrounding a sleeve 120 and disposed axially between abutment plate 40 and presser plate 64. It will be appreciated that axial movement of presser plates 62 and 64 in the direction to achieve clutch engagement compresses springs 126, whereby the springs store energy to return the presser plates in the opposite direction. Moreover, it will be appreciated that prior to such compression of springs 126 the latter exert a sufficient force on the presser plates to assure the desired braking action when the clutch is disengaged.

In the embodiment illustrated, fluid pressure actuated piston and cylinder assembly 66 is comprised of a plurality of piston and cylinder components coaxial with shaft 38 and operable to displace presser plate 64, rods 118 and pressure plate 62 in the direction to displace clutch discs 104 and 114 toward abutment plate 40. More particularly, a plurality of annual piston discs 128a, 128b and 128c, each having an axially extending hub 130, are mounted on shaft 38 for rotation therewith such as by corresponding splined interconnections 132. Axially inner piston disc 128a abuts against the corresponding face of retaining ring 98 on shaft 38, and the outer end of hub 130 of piston disc 128c abuts against a ring 134 surrounding shaft 38, and a threaded ring 136 engages ring 134 to retain the piston discs against axial displacement relative to shaft 38 as illustrated in FIG. 2.

Hubs 130 axially space piston discs 128a and 128b to define a chamber 138 therebetween, and axially space piston discs 128b and 128c to define a chamber 140 therebetween. Further, the space between piston disc 128a and clutch presser plate 64 defines a chamber 142 therebetween. The radially inner ends of the piston discs and hubs 130 are each provided with passageways 133 in alignment with a corresponding one of the radial passages 70 in shaft 38 and opening into a corersponding one of the chambers 138, 140 and 142. It will be appreciated therefore, that air under pressure introduced into shaft passageway 68 enters radial passages 70 in the shaft and flows therefrom into the chambers 138, 140 and 142 and on corresponding sides of the piston discs.

A cylinder assembly is associated with piston discs 128a, 128b and 128c and with clutch pressure plate 64 and is operable upon the flow of air under pressure into chambers 138, 140 and 142 to axially displace the pressure plate to the left in FIG. 3. More particularly, the cylinder assembly includes a cylinder disc 144 interposed between piston discs 128a and 128b, and a cylinder disc 146 interposed between piston discs 128b and 128c. Each of the cylinder discs 144 and 146 surrounds hub 130 of the corresponding piston disc and carries a suitable sealing element, not designated numerically, for sealing engagement with the outer surface of the piston disc hub. In the embodiment illustrated, presser plate 64 defines a cylinder disc for the cylinder assembly, and the outer periphery of clutch support ring 90 carries a sealing element 147 to seal with the inner periphery of the presser plate. It will be appreciated, however, that clutch presser plate 64 could readily be a separate component mechanically interconnected with the cylinder assembly as opposed to being an integral part thereof.

Each of the cylinder discs 144 and 146 is provided with an axially extending outer flange 148, and the outer periphery of pressure plate 64 is provided with a similar axially extending flange 150. Flanges 148 and 150 axially space the cylinder discs and presser plate and are suitably interconnected with one another against relative axial displacement. The outer peripheries of piston discs 128a, 128b and 128c each carry an annular sealing element, not designated numerically, for sealing engagement with the inner surface of the corresponding cylinder flange. Further, cylinder discs 144 and 146 are provided with passageways 144a and 146a, respectively, which vent the space between the cylinder disc and the adjacent piston disc on the side of the cylinder disc opposite chambers 138 and 140. It will be appreciated that such venting opens the corresponding side of the cylinder disc to the lubricating and cooling fluid in the housing to achieve cooling and lubricating of the piston and cylinder assembly components and to prevent trapping of fluid between the piston and cylinder discs which would prevent relative displacement therebetween upon the introduction of air into chambers 138 and 140.

The operation of the brake and clutch assemblies and the piston and cylinder actuating mechanism therefor is as follows. In the positions of the components illustrated in FIG. 3, air under pressure in chambers 138, 140 and 142 has been relieved and springs 126 bias presser plate 64 away from abutment plate 40, whereby presser plate 62 presses brake discs 100 and 110 in the direction of abutment plate 40 to brake rotation of shaft 38. Upon the introduction of air under pressure into passageway 68 of shaft 38, the air enters chambers 138, 140 and 142 to displace cylinder discs 144 and 146 and presser plate 64 in the direction toward abutment plate 40. Accordingly, presser plate 62 moves away from abutment plate 40 releasing the brake, and clutch disc elements 104 and 114 are pressed against the corresponding face of abutment plate 40 to engage the clutch. Since clutch disc elements 114 are mounted on sleeve 54, rotation is imparted to shaft 38. When it is desired to brake the shaft, the air pressure to chambers 138, 140 and 142 is relieved such as by opening communication between passageway 68 and the source of air under pressure, and springs 126 displace presser plate 64 and thus the cylinder assembly in the direction away from abutment plate 40 to release the clutch. Simultaneously, presser plate 62 is moved axially toward abutment plate 40 to press brake discs 100 and 110 against the abutment plate and thus brake rotation of the shaft.

While a particular piston and cylinder structure has been illustrated in conjunction with the present embodiment, it will be appreciated that other structural arrangements can be employed. In this respect, as mentioned hereinabove, the clutch presser plate and the cylinder component defined thereby could be separate elements mechanically interconnected to achieve displacement of the preser plate in response to displacement of the cylinder assembly. Moreover, it will be appreciated that the number of cooperable piston disc and cylinder disc components can be varied without departing from the principles of the present invention. Still further, the rod and sleeve arrangement could be defined by rods alone having radial shoulders at the opposite ends thereof. The coaxial relationship between the piston and cylinder components, the brake and clutch presser plate components, and the fixed abutment ring therebetween together with springs 126 advantageously provide for a balanced application of pressure to the presser plates during actuation of the brake and clutch assemblies, and many modifications of the specific structure disclosed will be apparent to those skilled in the art to achieve the balanced force application and mechanically interlocked relationship between the clutch and brake presser plate components described hereinabove.

Figure 7:
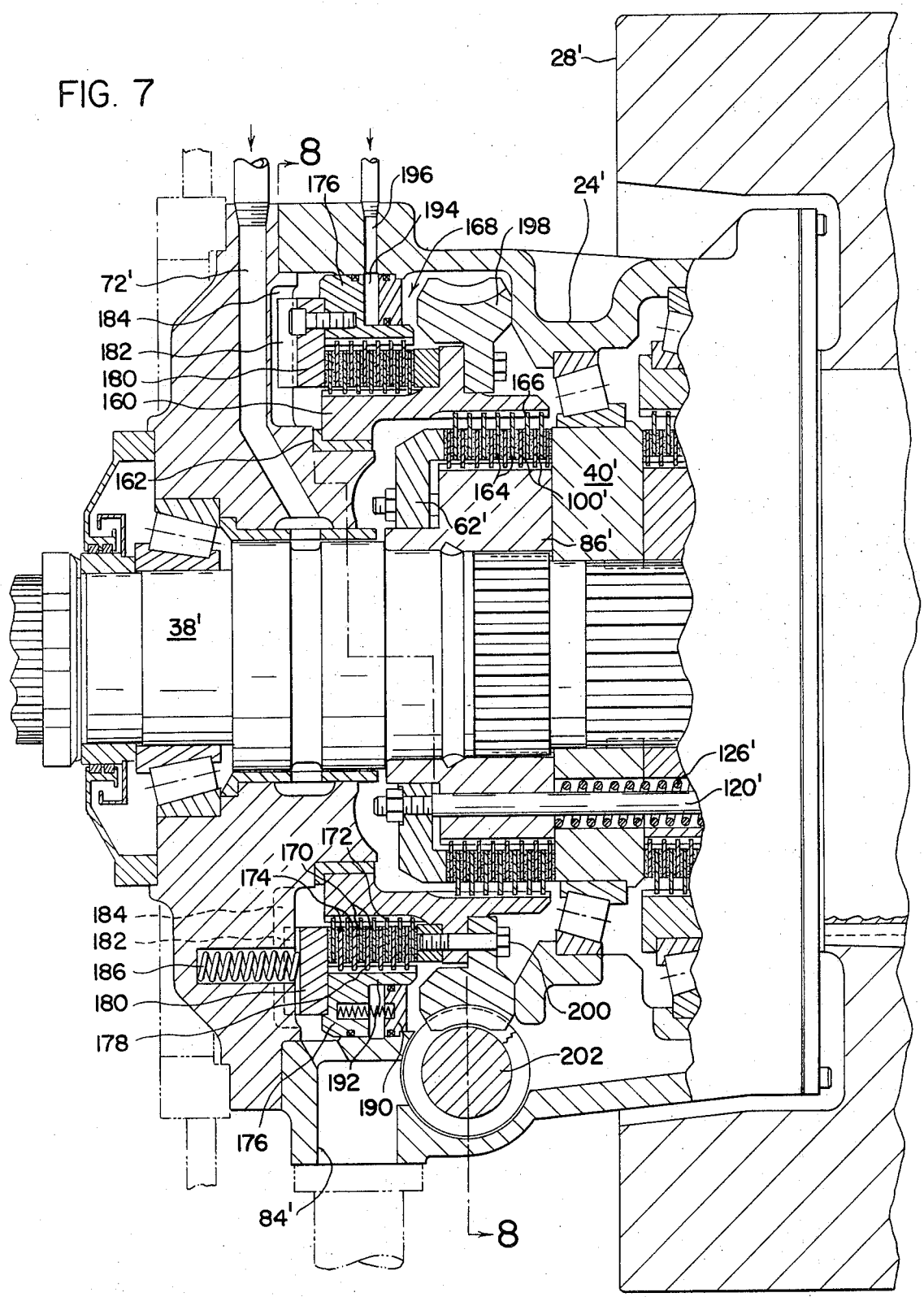
FIG. 7 is a side elevation view, in section, illustrating an arrangement for selectively rotating the drive shaft of a drive unit relative to a braked position thereof.
Figure 8:
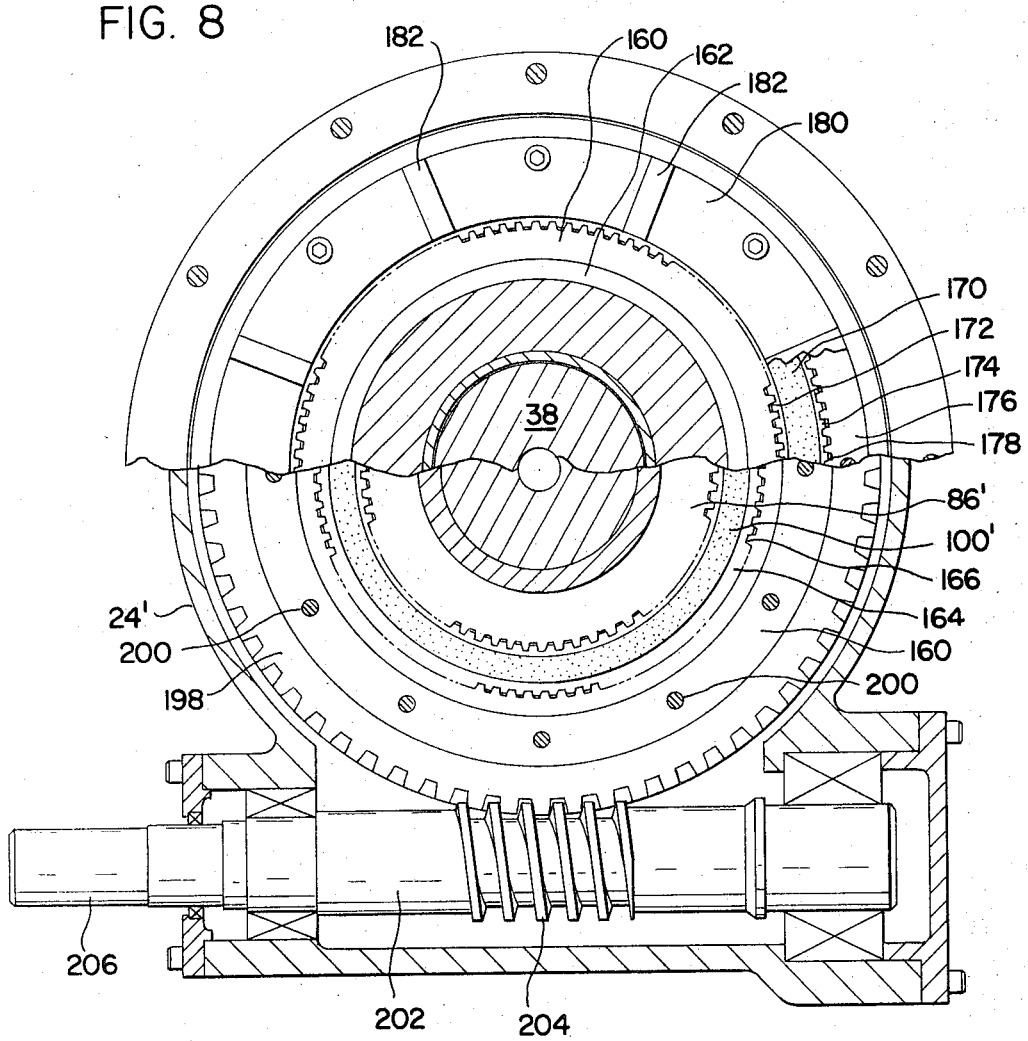
FIG. 8 is a cross-sectional view of the arrangement illustrated in FIG. 7, the section being along line 8—8 in FIG. 7; and, FIG. 9 is a sectional elevation view of another embodiment of a piston and cylinder arrangement for actuating the clutch and brake assemblies.

In accordance with another aspect of the present invention, the brake assembly of the drive mechanism described hereinabove can be structurally modified to advantageously provide for the output shaft of the drive mechanism to be incrementally rotated following disengagement of the clutch and engagement of the brake. A suitable brake structure for this purpose is illustrated in FIGS. 7 and 8 of the drawing. The components illustrated in FIGS. 7 and 8, other than the modifications relating to the brake assembly, correspond in operation and generally correspond in structure to the components described hereinabove in connection with the embodiment illustrated in FIGS. 2–6 of the drawing. Accordingly, in FIGS. 7 and 8 such corresponding components are identified by like numerals with primes added thereto.

The modified brake assembly illustrated in FIGS. 7 and 8 includes an annular ring component 160 surrounding shaft 38' and supported for rotation relative to housing 24' by a suitable bearing 162. Brake disc support ring 86' is interconnected with shaft 38' and supports a plurality of brake disc elements 100'. Brake ring 160 supports a plurality of brake discs 164 each of which is interposed between a pair of the discs 100'. Discs 164 are interconnected with support ring 160 for rotation therewith and axial displacement relative thereto such as by a splined interconnection 166. Brake presser plate 62' is adapted to be displaced axially toward abutment plate 40' in a manner described hereinabove to press brake discs 100 and 164 toward abutment plate 40' to stop shaft 38' upon release of the clutch mechanism.

During such braking, support ring 160 is restrained against rotation relative to housing 24', whereby brake discs 164 are likewise fixed against rotation. More particularly, in the embodiment illustrated, brake ring 160 is restrained against unintended rotation by a brake assembly 168 which is selectively releaseable when it is desired to impart rotation to ring 160. Brake assembly 168 includes a plurality of brake discs 170 interconnected with the outer periphery of ring 160 for rotation therewith and axial displacement relative thereto such as by a splined interconnection 172. Brake assembly 168 is further comprised of a plurality of brake discs 174 interposed between discs 170 and mounted on the inner periphery of an axially displaceable ring member 176 which is slideably engageable with the inner surface of housing 24. Brake discs 174 are axially slideable relative to ring 176 such as by a splined interconnection 178 therebetween.

An annular presser ring 180 is bolted to ring 176 for movement therewith and is provided at spaced locations about is periphery with axially extending keys 182 disposed in corresponding slots 184 in housing 24'. The key and slot arrangement prevents rotation of ring 180 and accordingly piston ring 176 and disc elements 174 relative to housing 24'. A plurality of coil springs 186 are disposed in corresponding openings in housing 24' spaced about the periphery of presser ring 180 and bias the presser ring toward brake disc elements 170 and 174 to press the latter against an abutment ring 188 which is mounted on brake ring 160 for rotation therewith. Accordingly, it will be appreciated that the force of springs 186 on presser plate 180 press the brake discs against abutment ring 188 to restrain rotation of brake ring 160 relative to housing 24'.

An annular ring 190 is interposed between housing 24' and the outer periphery of an annular hub or flange 192 on piston ring 176. Ring 190 is suitably secured to the housing against displacement relative thereto, and the axial space 194 between ring 190 and piston 176 defines an expansible chamber adapted to receive a suitable operating fluid for displacing piston ring 176 in the direction toward presser plate 180. Housing 24' is provided with a fluid passageway 196 connected to a suitable source of operating fluid, not illustrated, and leading to chamber 194.

It will be appreciated that by introducing fluid under pressure into chamber 194 piston member 197 is axially displaced against the bias of springs 186 to release the pressure of presser plate 180 against brake discs 170 and 174. Upon release of the fluid pressure, springs 186 bias presser plate 180 toward abutment plate 188, whereby the braking effect is again achieved. It will be further appreciated that when piston 176 has been actuated to release brake 168, rotation of brake ring 160 will impart rotation to shaft 38' through brake discs 100' and 164. Therefore, when shaft 38' has been braked following release of clutch 48' inching of shaft 38' can be achieved by releasing brake assembly 168 and rotating brake ring 160 relative to housing 24'. For this purpose, brake ring 160 is provided with a toothed wormwheel 198 secured thereto such as by bolts 200 which, in the embodiment illustrated, also serve to attach abutment ring 188 to brake ring 160. Housing 24' is provided with transversely aligned openings on opposite sides thereof which receive and suitably support a rotatable screw 202 having a screw flight 204 disposed in meshing engagement with the teeth of wormwheel 198. End 206 of screw 202 extends laterally of housing 24' for connection with a motor or the like, not illustrated, for imparting rotation to the screw and thus wormwheel 198.

Figure 9:
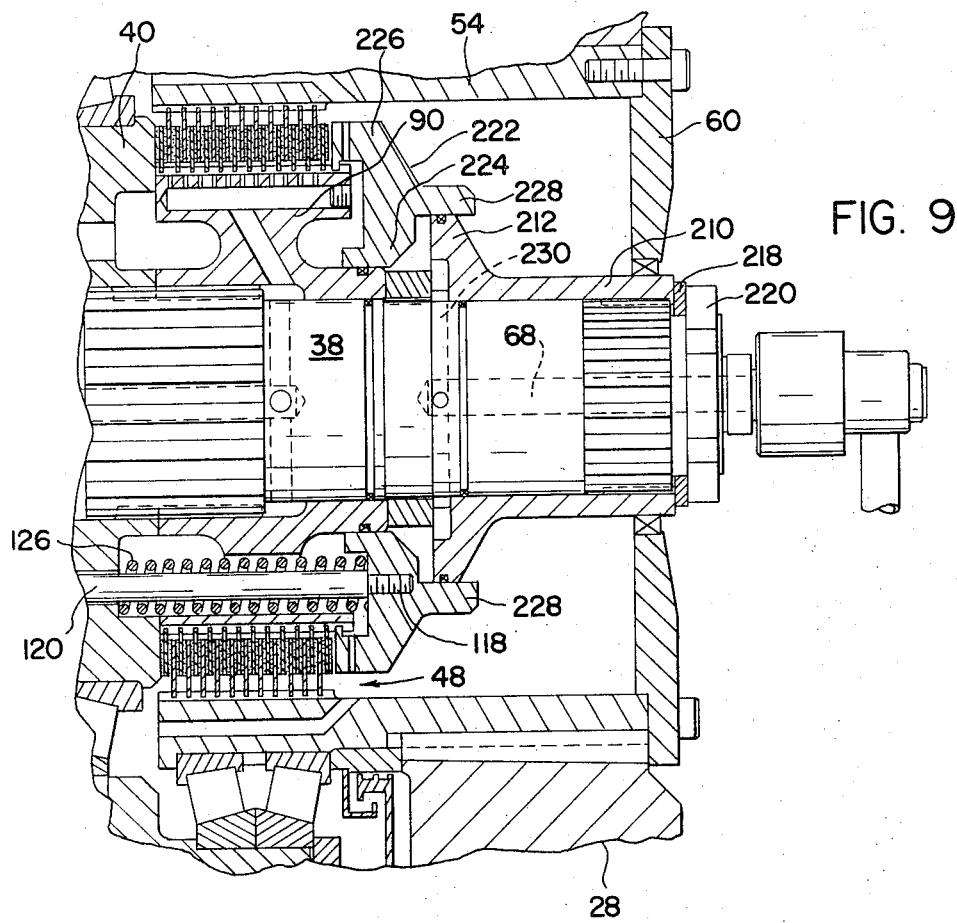

In FIG. 9 of the drawing there is illustrated a modified piston and cylinder arrangement for actuating the presser plates of the brake and clutch assemblies of the drive mechanism illustrated in FIGS. 2–6. Accordingly, in conjunction with the following description of the embodiment illustrated in FIG. 9, like numerals are employed to designate components corresponding to components illustrated in FIGS. 2–6. Referring now to FIG. 9, shaft 38 of the drive mechanism is provided with a piston component 210 in the form of a sleeve surrounding the end of the shaft and having a radially extending flange 212 at the inner end thereof. Sleeve 210 is interconnected with shaft 38 for rotation therewith such as by a splined interconnection 214 and is axially retained in place relative to the shaft between an inner retaining ring 216 surrounding the shaft and outer retaining rings 218 and 220.

The cylinder component in this embodiment is defined by an annular ring member 222 having an inner flange portion 224 disposed in sliding and sealing engagement with the outer periphery of clutch disc supporting ring 90. Cylinder member 222 further includes outer flange portion 226 providing a presser ring for the disc elements of clutch assembly 48. Cylinder member 222 further includes an axially extending wall 228 surrounding flange 212 of piston member 210, and the outer periphery of piston flange 212 is grooved to receive a sealing elements, not designated numerically, to seal the engagement between the piston and cylinder surfaces.

Shaft 38 is provided with an axial passageway 68 and radial passages 230 opening therefrom into the space between piston flange 212 and inner portion 224 of cylinder member 222. This piston and cylinder arrangement is particularly suited for the application of high pressure hydraulic fluid to achieve actuation of the brake and clutch assemblies. In this respect, hydraulic fluid under pressure is delivered through shaft passageways 68 and 230 into the space between the piston and cylinder members to displace cylinder member 222 axially in the direction of fixed abutment plate 40. Accordingly, presser ring portion 226 of the cylinder member presses the clutch discs toward abutment plate 40 to engage the clutch assembly. Rods 118 and sleeves 120 are interconnected with the brake presser plate as described hereinabove to simultaneous achieve release of the brake. Springs 126 are compressed in response to axial displacement of cylinder member 222 toward abutment plate 40 whereby, upon release of the hydraulic pressure, the springs operate to return the cylinder member in the direction to release the clutch and engage the brake as described hereinabove.

While considerable emphasis has been placed on the specific structures herein illustrated and described, it is to be distinctly understood that many of the structural features can be modified without departing from the principles of the present invention. For example, with regard to FIG. 2 of the drawing, one end of shaft 38 is illustrated as being provided with an integral gear 20, and a flexible coupling arrangement is illustrated in phantom as being adapted to be interconnected with the opposite end of shaft 38, whereby both of the shaft ends are operable for output transmission. It will be appreciated that both ends of the shaft can be provided with one or other of the arrangements illustrated, or with other output arrangements. Further, it will be appreciated that only one of the shaft ends need be provided with means for coupling the shaft to a machine or the like to be driven thereby, and that either of the shaft ends can be employed for this purpose. Many modifications of the shaft structure as well as the structure of other components of the overall assembly will be readily apparent to those skilled in the art. As many possible embodiments of the present invention may be made and as many changes may be made in the embodiments herein illustrated and described, it is to be distinctly understood that the foregoing descriptive matter is to be interpreted merely as illustrative of the present invention and not as a limitation.

Having thus described our invention, we claim:

1. A press drive mechanism comprising, a housing, shaft means extending through said housing and having opposite ends, bearing means within said housing supporting said shaft means for rotation relative to said housing about an axis, a flywheel at one end of said housing and having a first portion extending into the corresponding end of said housing and surrounding an axial portion of said shaft means, bearing means between said housing and first portion of said flywheel supporting said flywheel for rotation relative to said housing and shaft means, clutch disc means cooperatively supported relative to said shaft means and said first portion of said flywheel, brake disc means, cooperatively supported relative to said housing and said shaft means, said brake disc means being axially spaced from said clutch disc means in the direction from said one end of the housing toward the other, fixed abutment means on said shaft means between said clutch disc means and brake disc means, and clutch and brake actuating means, said actuating means including axially opposed disc engaging members movable in axially opposite directions to alternately displace said clutch disc means and said brake disc means in the corresponding direction toward said fixed abutment means, and said actuating means further including fluid actuated piston and cylinder means including piston means and cylinder means, said piston means surrounding said shaft means and fixed with respect thereto at the end of the shaft means corresponding to said one end of said housing, and said cylinder means being interconnected with said disc engaging members and axially displaceable in opposite directions relative to said piston means to move said disc engaging members in said opposite directions.

2. The drive mechanism according to claim 1, wherein said cylinder means is fluid actuated to move one of said disc engaging members to displace said clutch disc means in the direction toward said abutment means, and said clutch and brake actuating means further includes means to bias said cylinder means to move the other of said disc engaging members to displace said brake disc means in the direction toward said abutment means.

3. The drive mechanism according to claim 2, wherein said biasing means includes spring means disposed between said one disc engaging member and said fixed abutment means.

4. The drive mechanism according to claim 3, wherein said piston means includes at least two piston discs axially spaces apart along said shaft means to define a chamber and said cylinder means includes a cylinder disc disposed in said chamber, said shaft means including an internal fluid passageway connectable to a source of operating fluid and leading to said chamber on one side of said cylinder disc.

5. The drive mechanism according to claim 4, wherein said one portion of said flywheel surrounds said cylinder means and has an axially outer end with respect to said one end of the housing, the end of said shaft means corresponding to said one end of the housing projecting axially outwardly beyond said flywheel end.

6. The drive mechanism according to claim 4, wherein said housing is provided with inlet and outlet passages for circulation of cooling and lubricating liquid, and said shaft means includes internal passages for distributing said liquid and including first passage means communicating with said inlet passage, second passage means leading from said first passage means and opening to said brake disc means, and third passage means leading from said first passage means and opening to said clutch disc means.

7. The drive mechanism according to claim 1, and means independent of said clutch and brake actuating means for rotating said brake disc means and thus said shaft means when said brake disc means are in operable engagement with said fixed abutment means.

8. The drive mechanism according to claim 1, wherein said brake disc means includes concentric interposed first and second brake disc elements, means supporting said first elements on said shaft means for rotation therewith and means supporting said second elements relative to said housing means, said means supporting said second elements being selectively rotatable relative to said housing, and means for imparting rotation to said rotatable support means.

9. The drive mechanism according to claim 8, wherein said rotatable support means is annular gear means supported in said housing for rotation concentric with said shaft means, and said rotation imparting means includes drive gear means in meshing engagement with said annular gear means and rotatable to impart rotation to said annular gear means to rotate said second brake disc elements relative to said housing.

10. The drive mechanism according to claim 9, and second brake disc means between said housing and rotatable support means to restrain rotation of said rotatable support means, and means to release said second brake disc means.

* * * * *